(12) United States Patent
Jornlin et al.

(10) Patent No.: US 12,728,605 B2
(45) Date of Patent: Sep. 8, 2026

(54) POWERED TIRE REPAIR TOOL

(71) Applicant: MILWAUKEE ELECTRIC TOOL CORPORATION, Brookfield, WI (US)

(72) Inventors: Christopher D. Jornlin, Milwaukee, WI (US); Amith J. Baskaran, Wauwatosa, WI (US); John L. O'Sullivan, Brookfield, WI (US); Brian J. Prestley, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 746 days.

(21) Appl. No.: 17/392,642

(22) Filed: Aug. 3, 2021

(65) Prior Publication Data

US 2022/0040940 A1 Feb. 10, 2022

Related U.S. Application Data

(60) Provisional application No. 63/060,904, filed on Aug. 4, 2020.

(51) Int. Cl.
*B25B 21/00* (2006.01)
*B29C 73/26* (2006.01)

(52) U.S. Cl.
CPC ............ *B29C 73/26* (2013.01); *B25B 21/002* (2013.01); *B29C 2073/262* (2013.01); *B29C 2073/264* (2013.01)

(58) Field of Classification Search
CPC .............. B29C 73/26; B29C 2073/262; B29C 2073/264; B25B 21/00; B25B 21/001;
(Continued)

(56) References Cited

U.S. PATENT DOCUMENTS 7,051,622 B1 5/2006 Chen
7,377,197 B1 5/2008 Lin
(Continued)

FOREIGN PATENT DOCUMENTS

CN 200951629 Y 9/2007
CN 202114586 U 1/2012
(Continued)

OTHER PUBLICATIONS

International Search Report and Written Opinion for Application No. PCT/US2021/044286 dated Nov. 12, 2021 (13 pages).
(Continued)

*Primary Examiner* — Robert J Scruggs
(74) *Attorney, Agent, or Firm* — Michael Best & Friedrich LLP

(57) ABSTRACT

A tire repair tool includes a housing, an electric motor disposed within a motor housing portion, a battery receiving portion configured to receive a battery pack to power the electric motor, an actuator configured to selectively activate the electric motor, and a chuck rotatably driven by the motor and configured to receive one of a plurality of different tire repair accessories. The tire repair tool further includes a multi-speed gearbox disposed within the motor housing portion having a plurality of different gear ratios, a mode selector operative to adjust the multi-speed gearbox between the plurality of different gear ratios, and an electronic speed control system configured to operate the electric motor at less than its capable maximum operating speed when the gearbox is operated in each of the plurality of different gear ratios to further reduce a rotational speed of the chuck.

22 Claims, 8 Drawing Sheets

(58) Field of Classification Search

CPC ... B25B 21/002; B25B 21/007; B25B 21/008; B25B 21/02; B25B 23/00; B25B 23/02; B25B 23/14; B25B 23/147; B25D 16/006; B25D 17/00

See application file for complete search history.

(56) References Cited

U.S. PATENT DOCUMENTS

| | | | | |
|---|---|---|---|---|
| 7,677,844 | B2 | 3/2010 | Schell et al. | |
| 7,743,683 | B2 * | 6/2010 | Dayton | B25F 3/00 173/217 |
| 7,757,585 | B2 | 7/2010 | Brazeau | |
| 7,832,308 | B2 | 11/2010 | Wang | |
| 8,707,829 | B2 | 4/2014 | Kerner | |
| 9,067,368 | B2 | 6/2015 | Kerner | |
| 9,193,055 | B2 | 11/2015 | Lim et al. | |
| 9,636,809 | B2 | 5/2017 | Lars Elsmark | |
| 10,220,500 | B2 | 3/2019 | Lim et al. | |
| 10,512,971 | B2 | 12/2019 | Zhong et al. | |
| 10,661,424 | B2 | 5/2020 | Sawano et al. | |
| 10,850,380 | B2 | 12/2020 | Huber et al. | |
| 11,224,961 | B2 | 1/2022 | Sawano et al. | |
| 11,402,014 | B2 | 8/2022 | Hanslmeier et al. | |
| 11,598,413 | B2 | 3/2023 | Hanslmeier et al. | |
| 11,673,240 | B2 | 6/2023 | Araki et al. | |
| 11,738,438 | B2 | 8/2023 | Hiller et al. | |
| 2004/0211576 | A1 * | 10/2004 | Milbourne | B25F 5/02 173/48 |
| 2008/0264210 | A1 * | 10/2008 | Brazeau | B29C 73/08 81/15.7 |
| 2008/0265453 | A1 | 10/2008 | Brazeau | |
| 2009/0101376 | A1 * | 4/2009 | Walker | B25B 23/141 173/47 |
| 2011/0152029 | A1 * | 6/2011 | Rudolph | B25B 21/02 475/331 |
| 2011/0162861 | A1 | 7/2011 | Borinato et al. | |
| 2013/0220655 | A1 * | 8/2013 | Tomayko | B25F 5/00 173/47 |
| 2014/0102741 | A1 * | 4/2014 | Sekino | B25B 21/02 173/181 |
| 2016/0089734 | A1 * | 3/2016 | Eshleman | B23B 5/167 81/57.36 |
| 2017/0182647 | A1 * | 6/2017 | Mao | F16H 3/666 |
| 2019/0134801 | A1 | 5/2019 | Merget et al. | |
| 2020/0078921 | A1 | 3/2020 | Sawano et al. | |
| 2021/0078151 | A1 | 3/2021 | Huber et al. | |
| 2022/0282431 | A1 | 9/2022 | Weatherill et al. | |
| 2023/0256572 | A1 | 8/2023 | Araki et al. | |
| 2023/0405786 | A1 | 12/2023 | Merget et al. | |

FOREIGN PATENT DOCUMENTS

| | | | |
|---|---|---|---|
| CN | 205438115 | U | 8/2016 |
| CN | 106273562 | A | 1/2017 |
| CN | 206105573 | U | 4/2017 |
| CN | 106926485 | A | 7/2017 |
| EP | 2554306 | A2 | 2/2013 |
| EP | 3421183 | B1 | 5/2021 |
| GB | 2486306 | * | 6/2012 |
| JP | 2002321166 | A | 11/2002 |
| WO | 2022247813 | A1 | 12/2022 |

OTHER PUBLICATIONS

Partial Supplementary European Search Report for Application No. 21854096.1 dated Feb. 6, 2025 (16 pages).

* cited by examiner

POWERED TIRE REPAIR TOOL

CROSS-REFERENCE TO RELATED APPLICATIONS

This application claims priority to U.S. Provisional Patent Application No. 63/060,904 filed on Aug. 4, 2020, the entire content of which is incorporated herein by reference.

FIELD OF THE INVENTION

The present invention relates to tire repair tools, and more particularly to battery powered tire repair tools.

BACKGROUND OF THE INVENTION

Typically, tire repair tools are used to repair a puncture in an outer wall of a tire. In order to repair the puncture, a user must insert a plug or apply a patch to a damaged area in order to fill in the puncture. However, before the user can apply a patch/plug to the punctured area, the damaged area around the puncture must be prepped. To prep the damaged area, the user typically has to use various tire repair tools to first ream the damage from both the inside and outside of the tire, then buff the inner liner of the tire around the puncture to create a smooth surface that will facilitate a proper adhesion between the tire and the plug/patch. Normally, due to the different operating speeds of reaming and buffing as well as increased application speed, users have two separate pneumatic tools for each of the reaming and buffing operations. In other situations, the user can have a single pneumatic tool with different bit attachments corresponding to both reaming and buffing operations. Once the damaged area is properly reamed and buffed, the user can vacuum up excess debris and apply the plug/patch to the buffed area to repair the tire.

SUMMARY OF THE INVENTION

The present invention provides, in one aspect, a tire repair tool including a housing having a motor housing portion and a handle portion extending from the motor housing portion, an electric motor disposed within the motor housing portion, a battery receiving portion configured to receive a battery pack to power the electric motor, an actuator located on an outer surface of the housing configured to selectively activate the electric motor, and a chuck rotatably driven by the motor and configured to receive one of a plurality of different tire repair accessories. The tire repair tool further includes a multi-speed gearbox disposed within the motor housing portion having a plurality of different gear ratios corresponding to the plurality of tire repair accessories. The tire repair tool further includes a mode selector disposed on an outer surface of the housing operative to adjust the multi-speed gearbox between the plurality of different gear ratios. The tire repair tool further includes an electronic speed control system configured to operate the electric motor at less than its capable maximum operating speed when the gearbox is operated in each of the plurality of different gear ratios to further reduce a rotational speed of the chuck.

The present invention provides, in another aspect, a tire repair tool including a housing having a motor housing portion and a handle portion extending from the motor housing portion, an electric motor disposed within the motor housing portion, a chuck rotatably driven by the motor and configured to selectively receive one of a plurality of different tire repair accessories, and a multi-speed gearbox disposed within the motor housing portion having a plurality of different gear ratios corresponding to the plurality of tire repair accessories. The multi-speed gearbox includes a first planetary stage proximate the electric motor, the first planetary stage having a first planetary carrier, and a second planetary stage proximate the chuck, the second planetary stage having a ring gear that is axially movable between a first position, in which the ring gear is rotationally affixed to the housing, and a second position, in which the ring gear is rotationally affixed to the first planetary carrier for co-rotation therewith. The tire repair tool also includes a mode selector disposed on an outer surface of the motor housing portion. The mode selector includes a pivoting wire for selectively disabling the second planetary stage such that the second planetary stage co-rotates with the first planetary carrier in order to adjust the gearbox into one of the plurality of different gear ratios. The tire repair tool further includes an electronic speed control system configured to operate the electric motor at less than its capable maximum operating speed in each of the plurality of different gear ratios to further reduce a rotational speed of the chuck.

The present invention provides, in yet another aspect, a tire repair tool including a housing having a motor housing portion and a handle portion extending from the motor housing portion, an electric motor disposed within the motor housing portion, an actuator located on an outer surface of the housing configured to selectively activate the electric motor, a chuck rotatably driven by the motor and configured to selectively receive one of a plurality of different tire repair accessories, a multi-speed gearbox disposed within the motor housing portion having a plurality of different gear ratios corresponding to the plurality of tire repair accessories, a mode selector disposed on an outer surface of the motor housing portion operative to adjust the multi-speed gearbox between the plurality of different gear ratios, and an electronic speed control system configured to operate the electric motor at less than its capable maximum operating speed when the gearbox is operated in each of the plurality of different gear ratios to further reduce a rotational speed of the chuck. The electronic speed control system includes a motor controller configured to selectively activate the motor in response to movement of the actuator, a rotational speed sensor located in the motor housing portion for electrically communicating with the motor controller via a plurality of signal wires, and a magnet coupled to the mode selector, the magnet configured to emit a magnetic field that is selectively detectable by the rotational speed sensor, which in response is configured to selectively alter the operating speed of the motor.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
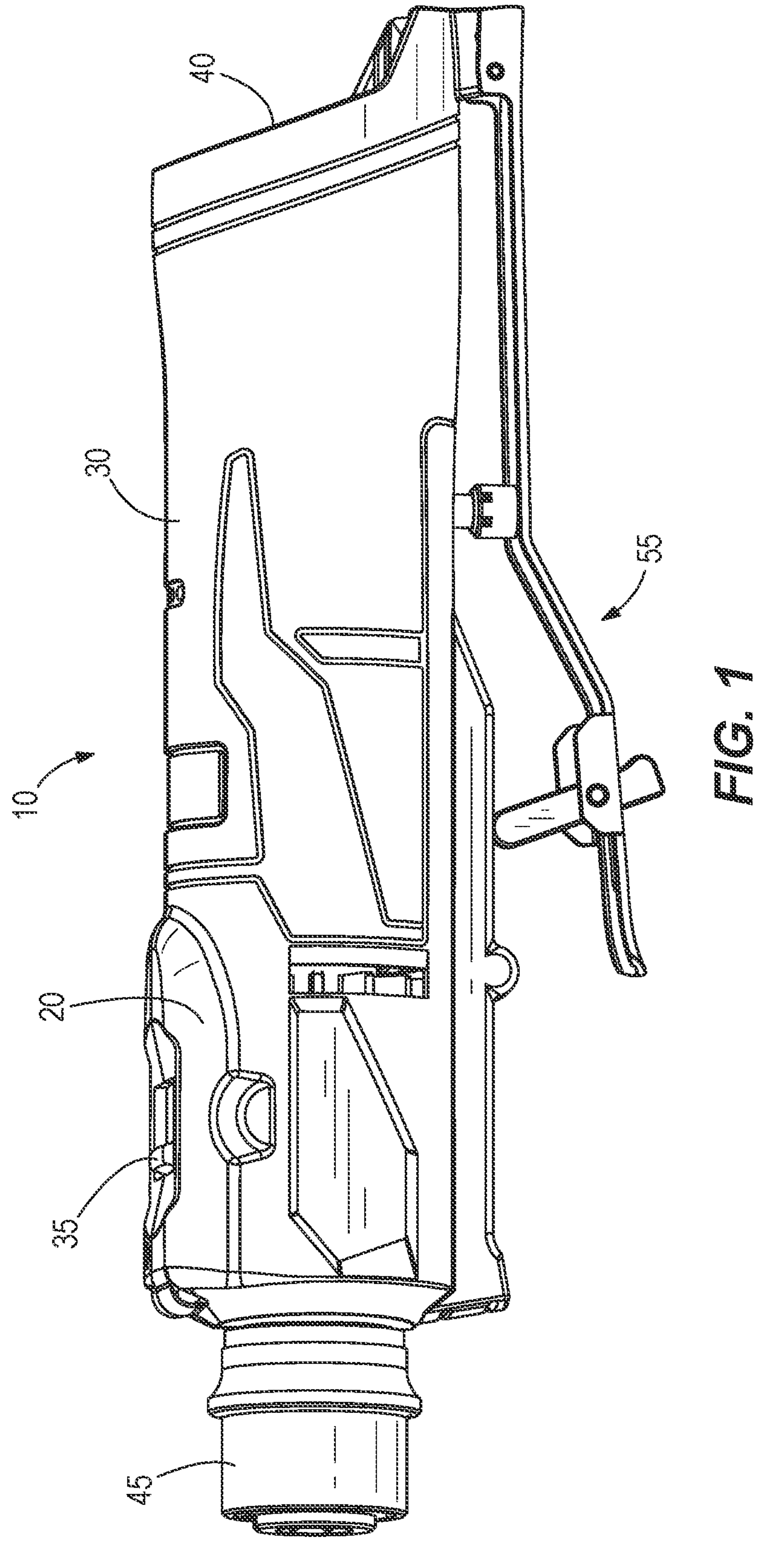
FIG. 1 is a side view of a tire repair tool in accordance with an embodiment of the invention.
Figure 2:
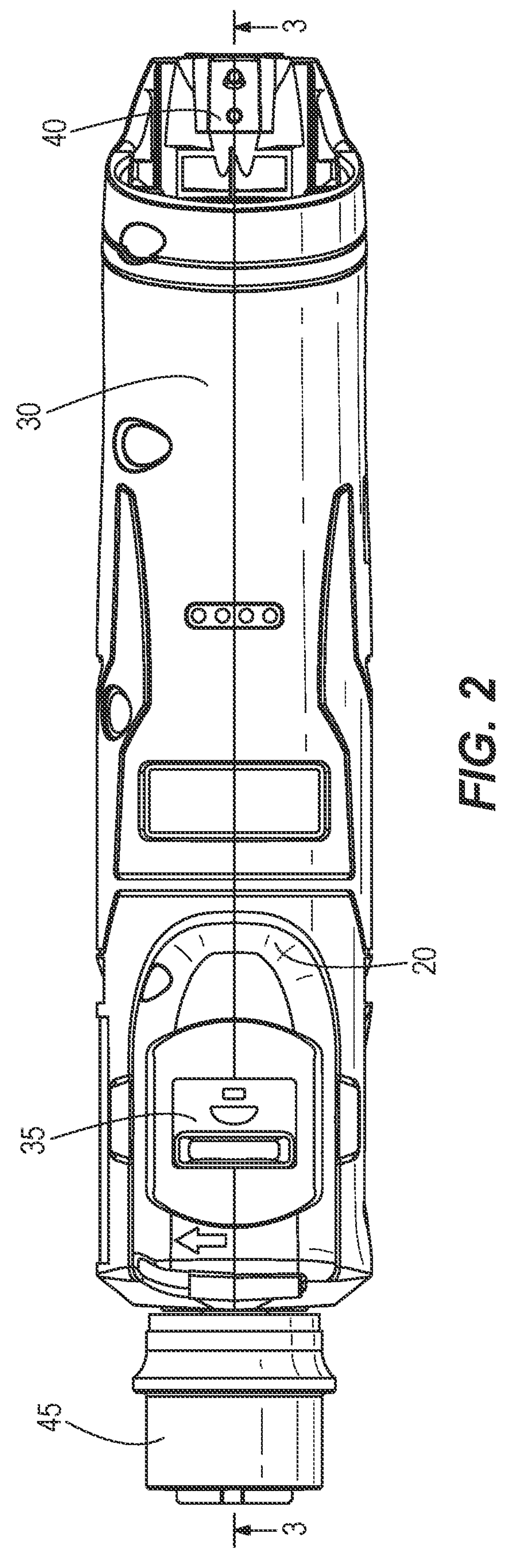
FIG. 2 is a top view of the tire repair tool of FIG. 1.

With reference to FIGS. 1 and 2, a tire repair tool, such as a tire buffer/reamer 10, includes a housing having a motor housing portion 20, a motor 80 (FIG. 3) supported in the motor housing portion 20, a handle portion 30 extending from the motor housing portion 20 that is graspable by the user of the tire buffer/reamer 10 during use, and a battery receiving portion 40 located on the handle portion 30 for detachably receiving a battery pack (not shown) that provides electrical power to the motor 80.

The illustrated tire buffer/reamer 10 further includes a mode selector 35 recessed on an outer surface of the motor housing portion 20, a multi-speed gearbox 100 (FIG. 3) supported in the motor housing portion 20 that is adjustable between different operating speeds in response to adjustment of the mode selector 35, and a quick-change chuck 45 extending from the motor housing portion 20 in an opposite direction as the handle portion 30 that is rotatably driven by the motor 80 and gearbox 100. With continued reference to FIG. 3, the quick-change chuck 45 also includes a receiving portion 60 for selectively receiving a plurality of tire repair accessories (not shown).

In some embodiments of the tire buffer/reamer 10, the plurality of tire repair accessories can include a buffing tool, such as a buffing wheel, and a reaming tool, such as a carbide drill bit.

With reference to FIGS. 1 and 2, the handle portion 30 further includes a paddle 55 located on an underside of the handle portion 30 that is graspable by the user and configured to selectively activate and deactivate the motor 80 in response to the actuation of the paddle 55.

Figure 3:
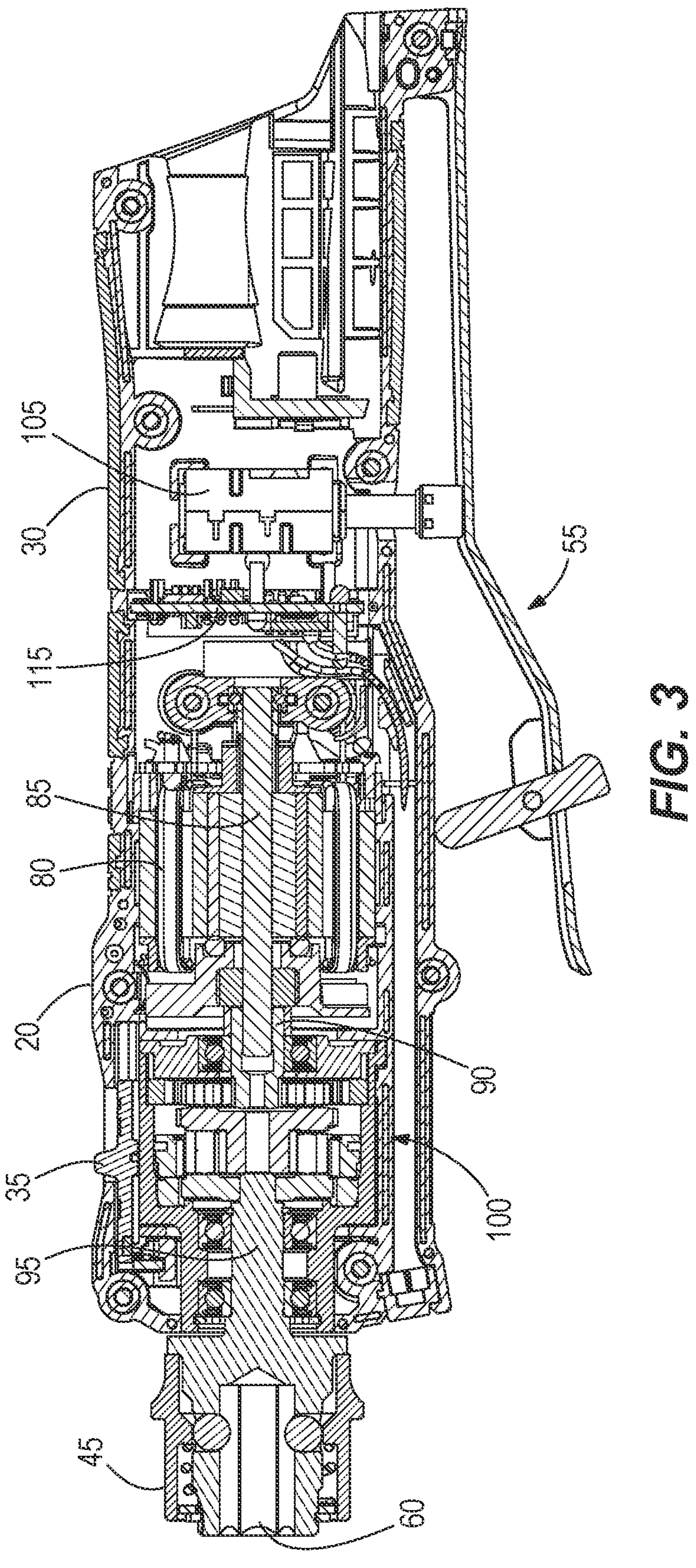
FIG. 3 is a side, cross-sectional view of the tire repair tool of FIG. 1.

With reference to FIG. 3, the tire buffer/reamer 10 further includes a controller 115 (e.g. a printed circuit board having one or more microprocessors and multiple field-effect transducers for driving the motor 80) located within the handle portion 30, a control switch 105 electrically connected to the controller 115 for providing an input signal to the controller 115 to activate and deactivate the motor 80 in response to actuation of the paddle 55.

To activate the motor 80, the user grasps the handle portion 30, depresses the paddle 55 toward the handle portion 30, thereby actuating the control switch 105 which, in turn, provides a control signal to the controller 115 to activate the motor 80. In some embodiments of the tire buffer/reamer 10, the control switch 105 provides a variable control signal to the controller 115 in response to progressive depression of the paddle 55, to thereby cause the rotational speed of the motor 80 to be adjusted in proportion to the amount that he paddle 55 is depressed.

With continued reference to FIG. 3, the motor 80 further includes an output shaft 85 for transmitting torque generated by the motor 80 to the multi-speed gearbox 100, which in turn transfers the torque to a chuck shaft 95 connected to the chuck 45. In some embodiments, the gearbox 100 includes a shaft coupler 90, one end of which includes a sun gear that is meshed with a first planetary stage of the gearbox 100 and the opposite end of which is coupled for co-rotation with the output shaft 85. To adjust the rotational speed of the gearbox 100 between a plurality of operation speeds, the user actuates the mode selector 35 according to a desired application (e.g. reaming, buffing, etc.), which adjusts the gear ratios within the gearbox 100 to coincide with the selected mode.

In some embodiments of the tire buffer/reamer 10, the mode selector 35 can be configured to toggle the tire buffer/reamer 10 between a first, buffing mode, and a second, reaming (drilling) mode. To accurately perform the buffing operation, the buffing mode requires the multi-speed gearbox 100 to spin the buffing accessory at or above 2,500 RPM, but less than 5,000 RPM. If the buffing tool doesn't rotate fast enough, the surface of the tire doesn't get properly smoothed, and the adhesive used to secure a patch won't stick to the rubber. However, if the buffing tool rotates above 5,000 RPM, the rubber in the tire will begin to burn, damaging the tire further. To switch over to the reaming operation, the user simply actuates the mode selector 35, causing the multi-speed gearbox 100 to adjust to a gear ratio coinciding with a reaming operation. The reaming operation requires the gearbox 100 to spin the reaming accessory at a speed of 1,200 RPM or less. Likewise, with reaming, if the reaming accessory spins above 1,200 RPM, the interior of the puncture that the user is reaming will begin to scorch, damaging the tire further.

Figure 4:
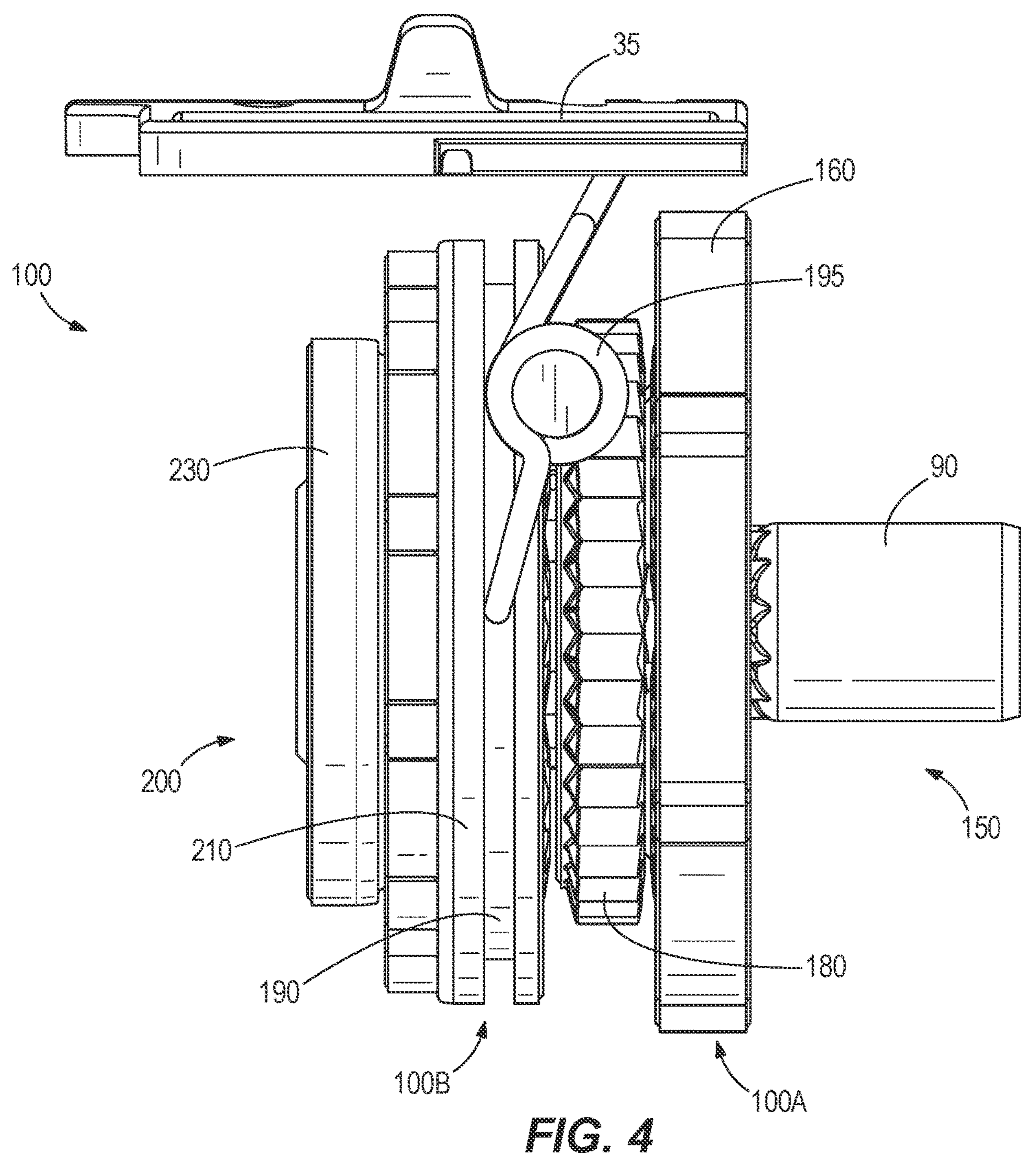
FIG. 4 is a side view of a mode selector switch and a multi-speed gearbox of the tire repair tool of FIG.1.

FIG. 4 illustrates an embodiment of the multi-speed gearbox 100 configured to operate alternatively in the buffing and reaming modes, and at the abovementioned respective buffing and reaming operation speeds. FIG. 4 represents a side view of the entire multi-speed gearbox 100 including a motor facing side 150 having the shaft coupler 90 for receiving torque from the motor 80, and a chuck facing side 200 for transmitting the torque and speed output from the gearbox 100 to the chuck 45 for rotating one of the plurality of tire repair accessories. The illustrated gearbox 100 is configured as a planetary gearbox having a plurality of stages 100A, 100B, one of which may be deactivated to provide a multi-speed output corresponding to the buffing or reaming operations.

Figure 5A:
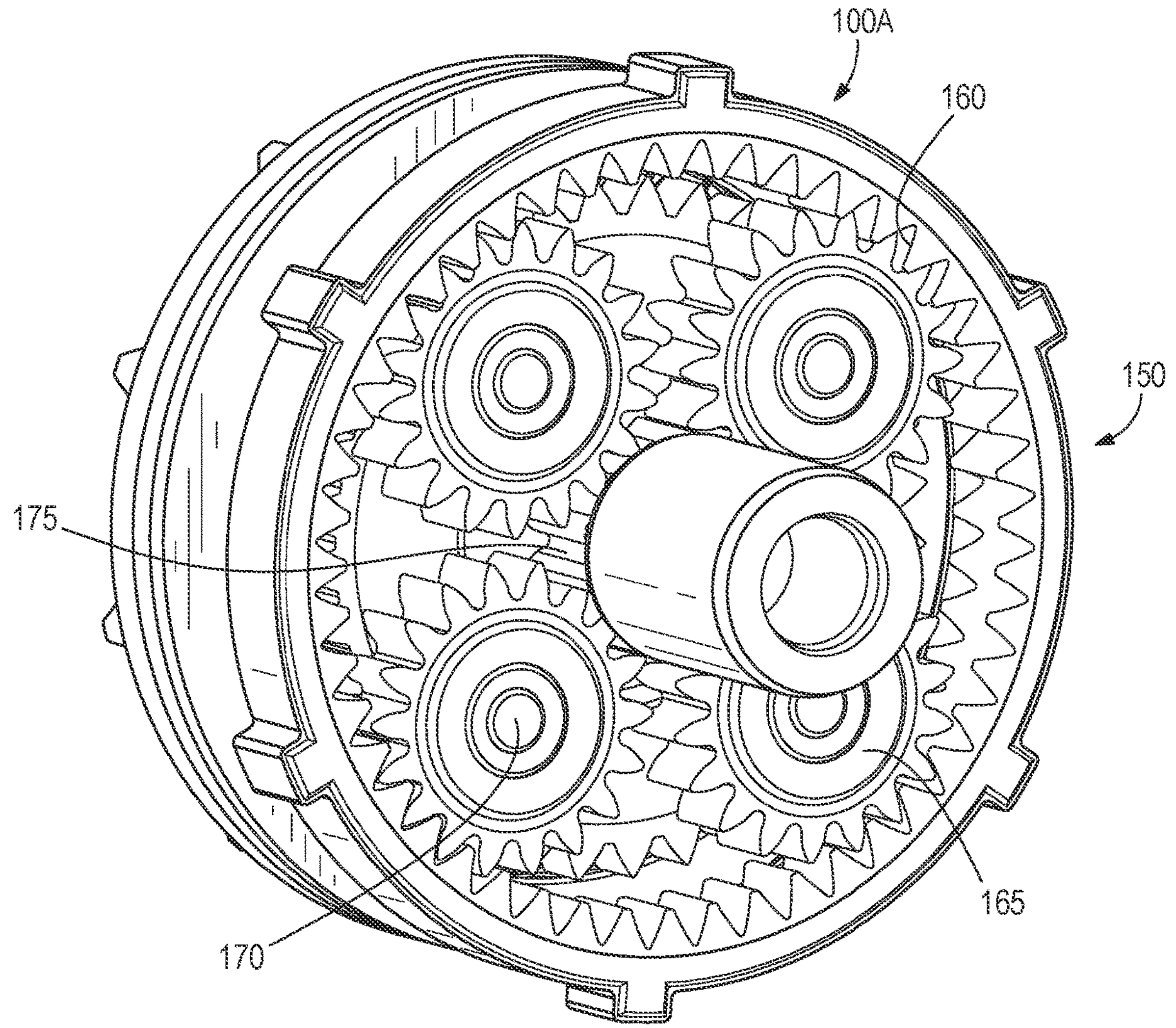
FIG. 5A is a perspective view of a first planetary stage of the multi-speed gearbox of FIG. 4.

For example, with respect to FIGS. 4 and 5A, and the motor side 150 of the gearbox 100, a first planetary stage 100A includes a first sun gear 175 integrally formed with and driven by the shaft coupler 90 configured to drive a plurality of first planetary gears 165 (e.g. spur gears). The first planetary gears 165 orbit around the first sun gear 175 within a stationary, first ring gear 160 supported in the motor housing portion 20, and each of the first planetary gears 165 is rotationally supported upon a first carrier 180 via a plurality of pins 170. The amount of speed reduction performed by the first stage 100A of the multi-speed gearbox 100 coincides with a first gear ratio of the gearbox 100.

Figure 5B:
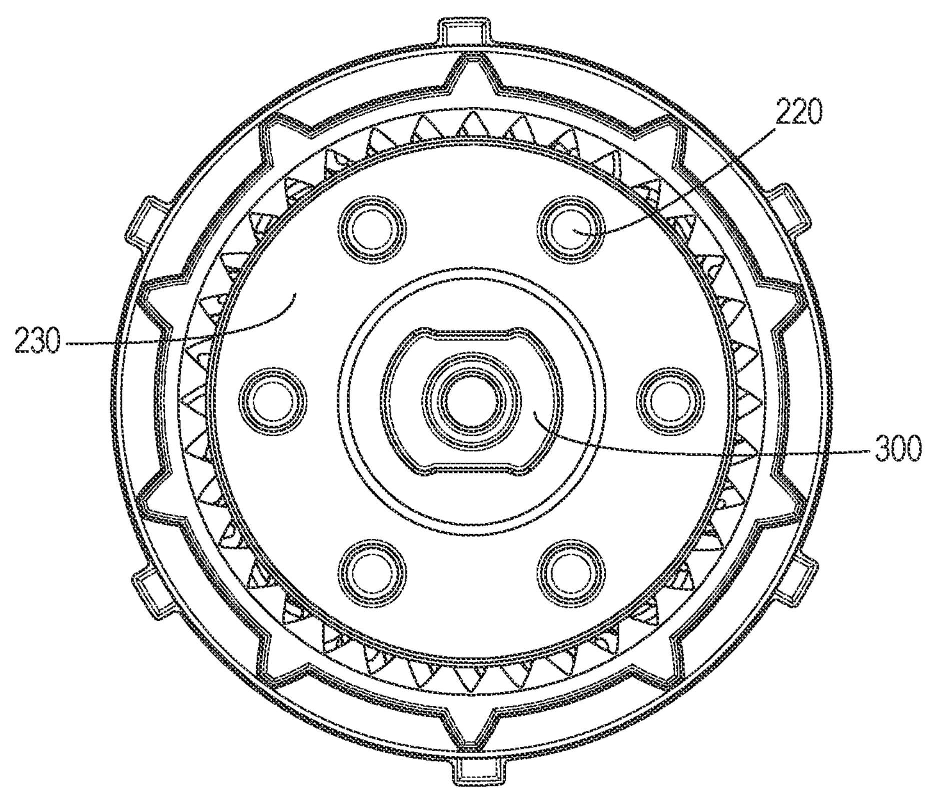
FIG. 5B is front view of the multi-speed gearbox of FIG. 4.
Figure 5C:
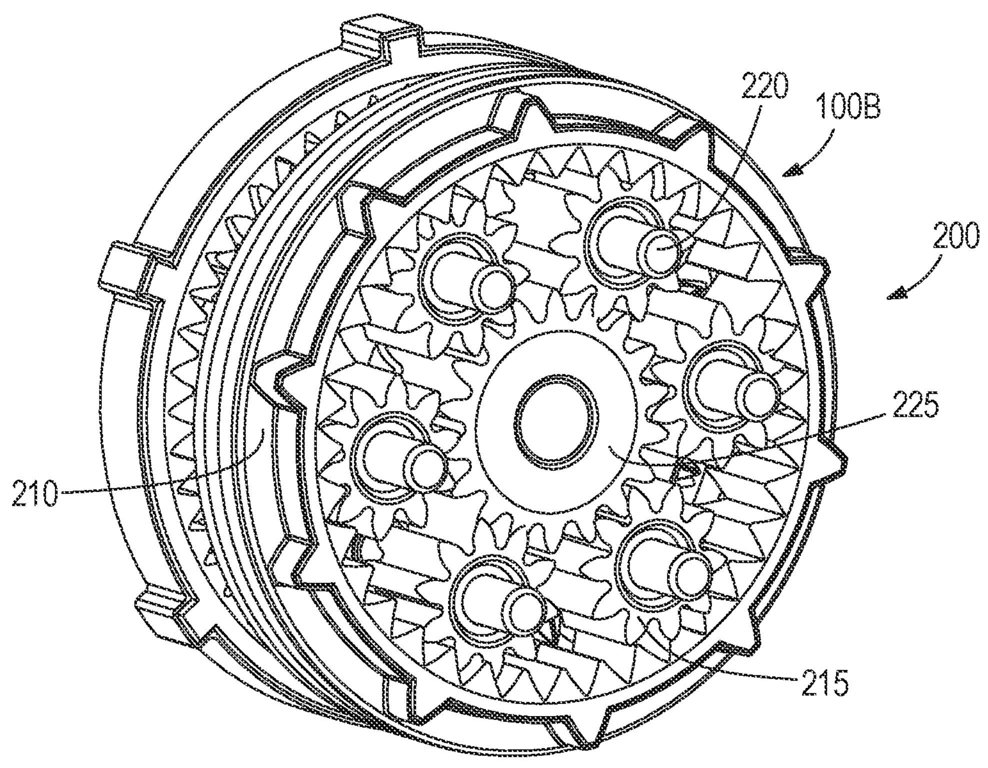
FIG. 5C is a perspective view of a second planetary stage of the multi-speed gearbox of FIG. 4.

With reference to FIGS. 4, 5B, and 5C, the second planetary stage 100B is rotatably driven by the first carrier 180 of the first planetary stage 100A. The first carrier 180 of the first stage 100A includes a second sun gear 225 (FIG. 5C) meshed with the plurality of second planetary gears 215 within a second ring gear 210 supported in the motor housing portion 20. The plurality of second planetary gears 215 are rotatably supported on a second carrier 230 disposed on the chuck side 200 of the gearbox 100 via a plurality of pins 220. The second carrier 230 includes a non-cylindrical bore 300 shaped such that the chuck shaft 95 is received within the bore 300, allowing for the gearbox 100 to be coupled for co-rotation with the chuck shaft 95. The amount of speed reduction performed by the second planetary gear stage 100B in addition to that of the first planetary gear stage 100A coincides with a second gear ratio of the gearbox 100.

With continued reference to FIG. 4, the gearbox 100 can be configured in a first operational speed corresponding to a low-speed mode and a second operational speed corresponding to a high-speed mode. The operational speeds can be selectively actuated by the mode selector 35. In the illustrated embodiment of the tire buffer/reamer 10, the mode selector 35 is configured as a slide switch moveable between a first, low-speed position and a second, high-speed position. The first, low-speed mode is illustrated in FIG. 4 with the mode selector 35 being positioned in the first position, and both the first and second planetary stages 100A, 100B being enabled to adjust the rotational output from the motor 80 via their respective gear ratios across both stages 100A, 100B.

To adjust the gearbox 100 to the second, high-speed mode, the mode selector 35 is moved to the second position. When the mode selector 35 is moved to the second position, the second planetary stage 100B is deactivated by moving the second ring gear 210 from a first position in which its rotationally affixed to the housing, to a second position, in which the second ring gear 210 is rotationally affixed to and co-rotatable with the first carrier 180 of the first planetary stage 100A. Consequently, the second planetary gears 215 and the second carrier 230 of the second planetary stage 100B would also co-rotate with the first carrier 180 of the first planetary stage 100A, thereby transferring the rotational output of the first carrier 180 of the first planetary stage 100A through all of the components of the second planetary stage 100B without any additional speed reduction, effectively disabling the second planetary stage 100B.

To facilitate the movement of the second ring gear 210 between the first and second operational speeds corresponding to the first and second positions of the mode selector 35, respectively, a pivoting wire 195 is positioned between the mode selector 35 and the second ring gear 210. The pivoting wire 195 transfers the linear movement of the mode selector 35 to the second ring gear 210 between the above-described positions for providing the high-speed and low-speed modes of the tire buffer/reamer 10. Particularly, opposite ends of the wire 195 slide within a circumferential groove 190 in the second ring gear 210, thereby facilitating linear movement of the second ring gear 210 while permitting rotation of the second ring gear 210 in the high-speed mode of the tire buffer/reamer 10.

In some embodiments of the tire buffer/reamer 10, the high-speed mode can correspond with the buffing mode, and the low-speed mode can correspond with the reaming mode.

Figure 6:
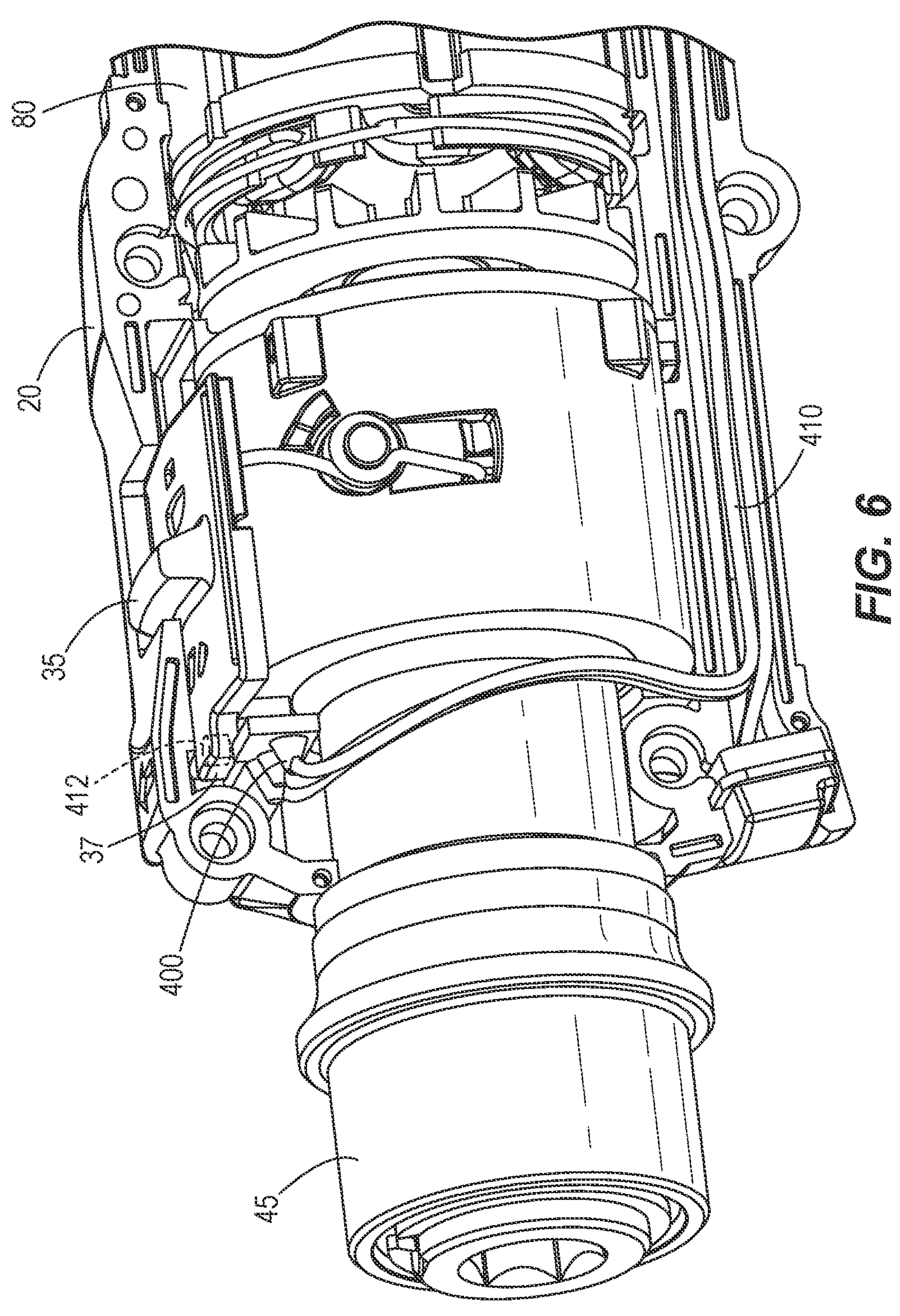
FIG. 6 is a side, partial cutaway view of an electronic speed control system of the tire repair tool of FIG. 1.

With reference to FIGS. 4 and 6, in conjunction with the planetary stages 100A, 100B of the multi-speed gearbox 100, the rotational speed of the tire buffer/reamer 10 is further controlled using an electronic speed control system. FIG. 6 illustrates an electronic speed control system including a rotational speed sensor 400 (e.g. one or more Hall-effect sensors on a printed circuit board) located at the front of the motor housing portion 20 that is electrically connected to the motor controller 115 (FIG. 3) via a plurality of signal wires 410, and a magnet (not shown) located on a front tab 37 of the mode selector 35 that emits a magnetic field that is selectively detectable by the sensor 400. When the mode selector 35 is positioned in the first, low-speed position, the magnet 412 on the mode selector 35 is located farther away from the rotational speed sensor 400, thus causing the electronic speed control system to limit the rotational speed of the chuck 45 to about 1,200 RPM. Without the electronic speed control system activated (i.e., with the motor 80 rotating at full speed or its capable maximum operating speed), the second gear ratio of the gearbox 100 would otherwise provide a speed output of up to about 1,600 RPM. As such, the electronic speed control system, with the mode selector 35 in the first, low-speed position, operates the motor 80 at less than its capable maximum operating speed (e.g., less than 100% PWM for a brushless DC motor) further reduces the rotational speed of the chuck 45 by 25% (if operating the motor 80 at 75% PWM).

Alternatively, when the mode selector 35 is positioned in the second, high-speed position, the magnet 412 on the mode selector 35 is located adjacent the rotational speed sensor 400, thereby activating the electronic speed control system to limit the rotational speed of the chuck 45 to about 2,500 RPM. Without the electronic speed control system activated (i.e., with the motor 80 rotating at full speed or 100% PWM), the first gear ratio of the gearbox 100 would otherwise provide a speed output of up to 3,600 RPM. As such, the electronic speed control system, with the mode selector 35 in the second, high-speed position, further reduces the rotational speed of the chuck 45 by about 31% (if operating the motor 80 at 69% PWM). Therefore, using the electronic speed control system in addition to the mechanical speed reductions provided by only first planetary stage 100A, or the first and second planetary stages 100A, 100B together, further reduces the rotational speed of the chuck 45 to acceptable limits for a buffering operation and a reaming operation, respectively.

Figure 7A:
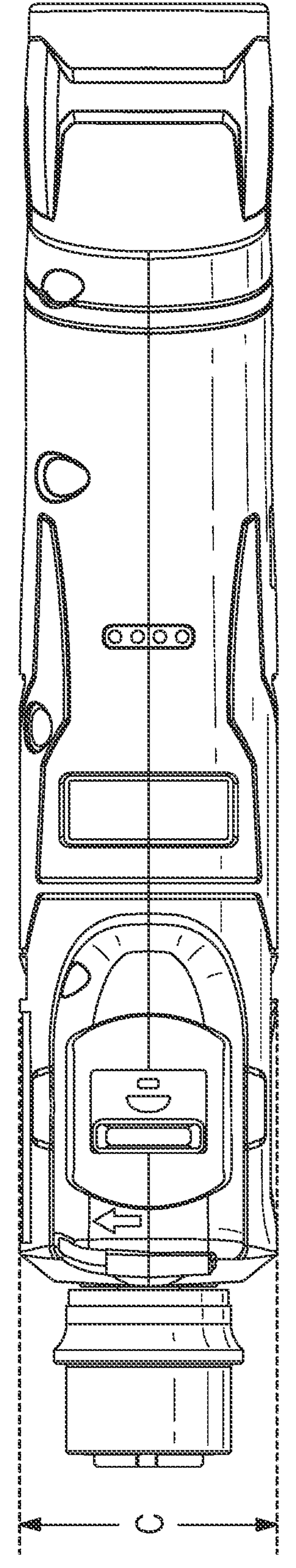
FIG. 7A is a top view of an example embodiment of the tire repair tool of FIG. 1.
Figure 7B:
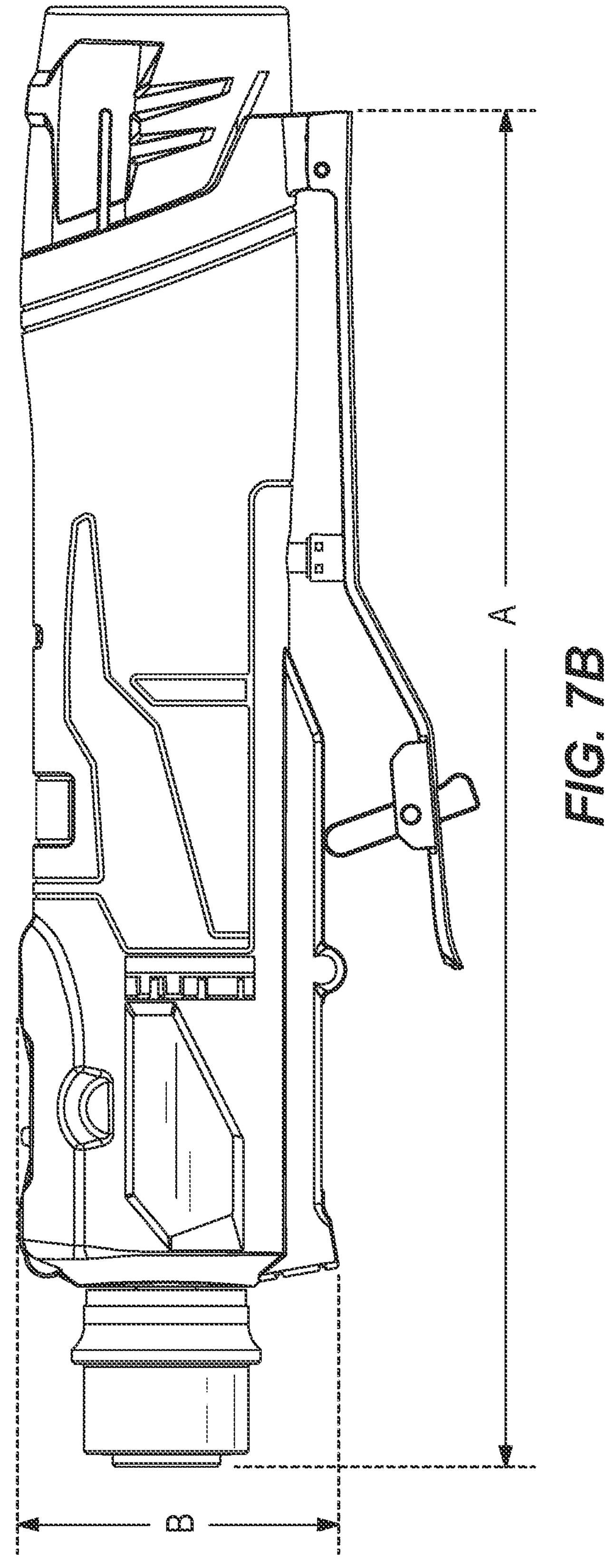
FIG. 7B is a side view of an example embodiment of the tire repair tool of FIG. 1.

FIGS. 7A and 7B illustrate an embodiment of the tire buffer/reamer tool 10 including a plurality of different dimensions A, B, and C. In some embodiments, the plurality of dimensions A, B, C can represent a length, body height, and body width of the tool 10, respectively. In other embodiments, the length A and body width C of the tool can be less than 11 inches and 2.3 inches, respectively, in order to house the multi-speed gearbox 100 and motor 80 with corresponding electronics in a relatively confined area. In other embodiments, the body height B of the tool 10 can be less than 2.5 inches in order to accommodate an LED in a relatively small area proximate the chuck 45.

Various features of the invention are set forth in the following claims.

What is claimed is:

1. A tire repair tool comprising:

a housing including a motor housing portion and a handle portion coaxially extending from the motor housing portion;

an electric motor disposed within the motor housing portion;

a battery receiving portion configured to receive a battery pack to power the electric motor;

an actuator located on an outer surface of the housing configured to selectively activate the electric motor, the actuator having a rear end pivotably coupled to the battery receiving portion and a front end that overlaps the motor housing portion;

a chuck rotatably driven by the motor and configured to selectively receive one of a plurality of different tire repair accessories;

a multi-speed gearbox disposed within the motor housing portion having a plurality of different gear ratios corresponding to the plurality of tire repair accessories;

a mode selector disposed on an outer surface of the motor housing portion operative to adjust the multi-speed gearbox between the plurality of different gear ratios; and an electronic speed control system configured to operate the electric motor at less than its capable maximum operating speed when the gearbox is operated in each of the plurality of different gear ratios to further reduce a rotational speed of the chuck.

2. The tire repair tool of claim 1, wherein the electronic speed control system comprises:

a motor controller configured to selectively activate the motor in response to movement of the actuator;

a rotational speed sensor located in the motor housing portion for electrically communicating with the motor controller via a plurality of signal wires; and a magnet coupled to the mode selector, the magnet configured to emit a magnetic field that is selectively detectable by the rotational speed sensor, which in response is configured to selectively alter the operating speed of the motor.

3. The tire repair tool of claim 2, wherein the mode selector is operative to adjust the multi-speed gearbox between a first gear ratio corresponding to a first operational mode and a second gear ratio corresponding to a second operational mode.

4. The tire repair tool of claim 3, wherein the first operational mode is a low-speed mode and the second operational mode is a high-speed mode in which the chuck rotates at a higher rotational speed than the low-speed mode.

5. The tire repair tool of claim 4, wherein, when the mode selector is in the first operational mode, the magnet is located at a distance spaced from the rotational speed sensor, and wherein, when the mode selector is in the second operational mode, the magnet is located adjacent the rotational speed sensor.

6. The tire repair tool of claim 4, wherein, in the low-speed mode, the chuck rotates at 1,200 RPM, and wherein, in the high-speed mode, the chuck rotates at 2,500 RPM.

7. The tire repair tool of claim 3, wherein the first operational mode corresponds to a first tire repair accessory, and the second operational mode corresponds to a second tire repair accessory.

8. The tire repair tool of claim 7, wherein the first tire repair accessory is a reamer and the second tire repair accessory is a buffer.

9. The tire repair tool of claim 3, wherein, in the first operational mode, the electronic speed control system adjusts the operating speed of the electric motor by a first speed to operate the electric motor at less than its capable maximum operating speed, and wherein, in the second operational mode, the electronic speed control system adjusts the operating speed of the electric motor by a second speed different than the first speed to operate the electric motor at less than its capable maximum operating speed.

10. The tire repair tool of claim 1, wherein the multi-speed gearbox further comprises:

a first planetary stage proximate the electric motor, the first planetary stage including a first planetary carrier; and a second planetary stage proximate the chuck, the second planetary stage including a ring gear that is axially movable between a first position, in which the ring gear is rotationally affixed to the housing, and a second position, in which the ring gear is rotationally affixed to the first planetary carrier for co-rotation therewith.

11. The tire repair tool of claim 1, wherein the tool includes a length less than 11 inches.

12. The tire repair tool of claim 1, wherein the tool includes a width less than 2.3 inches.

13. The tire repair tool of claim 1, wherein the tool includes a height less than 2.5 inches.

14. A tire repair tool comprising:

a housing including a motor housing portion and a handle portion coaxially extending from the motor housing portion;

an electric motor disposed within the motor housing portion;

a battery receiving portion configured to receive a battery pack to power the electric motor;

an actuator located on an outer surface of the housing configured to selectively activate the electric motor, the actuator having a rear end pivotably coupled to the battery receiving portion and a front end that overlaps the motor housing portion;

a chuck rotatably driven by the motor and configured to selectively receive one of a plurality of different tire repair accessories;

a multi-speed gearbox disposed within the motor housing portion having a plurality of different gear ratios corresponding to the plurality of tire repair accessories, the multi-speed gearbox including a first planetary stage proximate the electric motor, the first planetary stage having a first planetary carrier, and a second planetary stage proximate the chuck, the second planetary stage including a ring gear that is axially movable between a first position, in which the ring gear is rotationally affixed to the housing, and a second position, in which the ring gear is rotationally affixed to the first planetary carrier for co-rotation therewith;

a mode selector disposed on an outer surface of the motor housing portion, the mode selector including a pivoting wire for selectively disabling the second planetary stage such that the second planetary stage co-rotates with the first planetary carrier in order to adjust the gearbox into one of the plurality of different gear ratios; and an electronic speed control system configured to operate the electric motor at less than its capable maximum operating speed in each of the plurality of different gear ratios to further reduce a rotational speed of the chuck.

15. The tire repair tool of claim 14, wherein the plurality of different gear ratios includes a first gear ratio defined by an amount of speed reduction performed by the first planetary stage, and a second gear ratio defined by an amount of speed reduction performed by both the first planetary stage and the secondary planetary stage.

16. The tire repair tool of claim 15, wherein the electronic speed control system comprises:

a motor controller configured to selectively activate the motor in response to movement of the actuator;

a rotational speed sensor located in the motor housing portion for electrically communicating with the motor controller via a plurality of signal wires; and a magnet coupled to the mode selector having a magnet for movement therewith, the magnet configured to emit a magnetic field that is selectively detectable by the rotational speed sensor, which in response is configured to selectively alter the operating speed of the motor.

17. The tire repair tool of claim 16, wherein the mode selector is configured to move between a first operational mode corresponding with the first gear ratio and where the magnet is positioned at a distance spaced from the rotational speed sensor, and a second operational mode corresponding with the second gear ratio and where the magnet is positioned adjacent the rotational speed sensor.

18. The tire repair tool of claim 17, wherein, in the first operational mode, the electronic speed control system adjusts the operating speed of the electric motor by a first speed to operate the electric motor at less than its capable maximum operating speed, and wherein, in the second operational mode, the electronic speed control system adjusts the operating speed of the electric motor by a second speed different than the first speed to operate the electric motor at less than its capable maximum operating speed.

19. A tire repair tool comprising:

a housing including a motor housing portion and a handle portion coaxially extending from the motor housing portion;

an electric motor disposed within the motor housing portion;

an actuator located on an outer surface of the housing configured to selectively activate the electric motor, the actuator having a rear end pivotably coupled to the battery receiving portion and a front end that overlaps the motor housing portion;

a chuck rotatably driven by the motor and configured to selectively receive one of a plurality of different tire repair accessories;

a multi-speed gearbox disposed within the motor housing portion having a plurality of different gear ratios corresponding to the plurality of tire repair accessories;

a mode selector disposed on an outer surface of the motor housing portion operative to adjust the multi-speed gearbox between the plurality of different gear ratios; and an electronic speed control system configured to operate the electric motor at less than its capable maximum operating speed when the gearbox is operated in each of the plurality of different gear ratios to further reduce a rotational speed of the chuck, the electronic speed control system including a motor controller configured to selectively activate the motor in response to movement of the actuator, a rotational speed sensor located in the motor housing portion for electrically communicating with the motor controller via a plurality of signal wires, and a magnet coupled to the mode selector, the magnet configured to emit a magnetic field that is selectively detectable by the rotational speed sensor, which in response is configured to selectively alter the operating speed of the motor.

20. The tire repair tool of claim 19, wherein the housing includes a battery receiving portion configured to receive a battery pack to power the electric motor.

21. The tire repair tool of claim 19, wherein the tool includes a length less than 11 inches, a width less than 2.3 inches, and a height less than 2.5 inches.

22. The tire repair tool of claim 19, wherein the mode selector is operative to adjust the multi-speed gearbox between a first gear ratio corresponding to a first operational mode, in which the electronic speed control system adjusts the operating speed of the electric motor by a first speed to operate the electric motor at less than its capable maximum operating speed, and a second gear ratio corresponding to a second operational mode, in which the electronic speed control system adjusts the operating speed of the electric motor by a second speed different than the first speed to operate the electric motor at less than its capable maximum operating speed.

* * * * *